United States Patent [19]

Köhli et al.

[11] 4,072,092
[45] Feb. 7, 1978

[54] METHOD OF AND AN APPARATUS FOR PREPARING A FOOD PRODUCT

[75] Inventors: Martti Ilmari Köhli, Stenhamra; Fjalar Ernst Erik Eklund, Danderyd; Bo Allan Callerhorn, Upplands Vasby, all of Sweden

[73] Assignee: Concordia Development AB, Sollentuna, Sweden

[21] Appl. No.: 669,628

[22] Filed: Mar. 23, 1976

[30] Foreign Application Priority Data

Mar. 25, 1975 Sweden .............................. 75034744

[51] Int. Cl.² .......................... A47J 37/08; A23L 3/00
[52] U.S. Cl. ....................................... 99/389; 99/386; 99/393; 99/443 C
[58] Field of Search ................ 99/379, 386, 389, 393, 99/391, 400, 401, 427, 443 C, 447

[56] References Cited

U.S. PATENT DOCUMENTS

| 706,502 | 8/1902 | Van Wie | 99/393 |
|---|---|---|---|
| 2,549,619 | 4/1951 | Miskella | 99/386 |
| 3,003,409 | 10/1961 | Mills | 99/443 C |
| 3,646,879 | 3/1972 | Palmason | 99/386 |

FOREIGN PATENT DOCUMENTS

94,648  10/1962  Denmark .............................. 99/386

Primary Examiner—Edward J. McCarthy
Attorney, Agent, or Firm—Curtis, Morris & Safford

[57] ABSTRACT

A food product is prepared in a vertically slot-shaped oven space by being exposed to IR-radiation having a very short wave-length of the order of μ simultaneously on two opposite vertical sides while being surrounded by a controlled air flow directed downwards. IR-radiation means are arranged adjacent the two opposite side walls delimiting the oven space. In a first embodiment the food product is held between two vertical net plates mounted on the inside of an oven door for being turned into the oven space when the door is shut. In a second embodiment the food product passes through the oven space while being held between two vertical parts of two endless net bands circulating downwards through the oven space.

12 Claims, 8 Drawing Figures

METHOD OF AND AN APPARATUS FOR PREPARING A FOOD PRODUCT

The present invention relates to the preparation or cooking of a food product of meat, fish or the like while using infrared radiation, below called IR-radiation.

So called IR-ovens are known, in which one utilizes mainly pure IR-radiation for preparing food products or for heating or reconstituting deep frozen, pre-prepared products. These known ovens have, however, not shown to be practically useful among other things because they have been complicated to operate, they have not given reproduceable results when preparing products of the same kind, they cannot quite simply be used for different kinds of products, they did not possess the required capacity and speed etc.

The object of the present invention is consequently to provide a method of and an apparatus for preparing food products by means of pure IR-radiation, wherein the disadvantages mentioned above are eliminated and other advantages are even gained.

This object has been reached owing to the fact that the method and the apparatus according to the present invention have the features apparent from the enclosed patent claims.

Thus, the invention essentially means that the product during the preparation or cooking is held vertically while being simultaneously irradiated from two sides, the product at the same time being encircled by an air flow, directed downwards. The air flow must be well controlled in such a way that otherwise ascending vapors, fumes, etc are kept away without giving any unfavourable cooling effect. In this way it has shown to be possible to obtain an extremely even and reproduceable radiation of the product under very even and well controlled temperature conditions, which in its turn has proved to give a most favourable preparation of especially meat products such as entrecote, tournedos, beef steaks etc.

The air flow directed downwards also means that deposit of fat above the irradiated product is entirely prevented, whereby the risk for fire in connection with dripping fat is eliminated.

It has shown to be advantageous to utilize IR-radiation well limited within the region of very short wave-lengths (preferably with a wave-length of the order of $\mu$m) and which is obtained on both sides with an effect of approximately 5-8 W/cm$^2$ on a distance of approximately 5 cm from the centre of the product.

Furthermore, it has shown to be advantageous to use a vertical slit- or gap-shaped oven space, IR-radiating means being arranged adjacent each of the side walls delimiting or defining the oven space. The oven space has owing to this a relatively small volume, which is advantageous in order to maintain the controlled air flow and for a quick reaching and keeping of the controlled temperature conditions.

The invention will hereafter be described in more detail in connection with the accompanying drawing, in which.

On the drawing like details of the various figures have been given the same reference numerals.

The apparatus according to FIGS. 1 – 6 consists of an oven part 1 and an operating and controlling part 2, arranged at one insulated side wall of said oven part. On its front the operating and controlling part 2 is provided with required controlling and indicating means for the operation of the apparatus, as will be described in more detail lateron. The front of oven part 1 consists, apart from a smaller lower part, of an oven door 3, the lower part of which on each side is pivoted on a horizontal shaft 4. The oven door can thus be turned from the vertical, shut position shown in FIG. 1, outwards and downwards into a horizontal open position. Oven part 1 has a substantially slotshaped, vertical oven space 5 with an extension in the depth direction of the apparatus from a front oven opening in a front cover sheet 45, i.e. principally from the inside of oven door 3 to a rear transversal partition wall 6. Oven space 5 is delimited on either sides by an IR-radiation battery or set 7 and 8, respectively, supported on an intermediate bottom wall 9 on a level with the lower edge of oven door 3. In the intermediate bottom wall 9 there is, below oven space 5, an opening covered with a grate 10, which opening is an evacuation opening for the atmosphere in the oven space, as will be described in more detail lateron. The oven space 5 extends essentially up to the level of an under-ceiling 11 but is through an opening in said ceiling in direct communication with a space 12 situated thereabove, the reasons for which will appear lateron. The space 12 is screened from space 14 formed between the insulated ceiling 13 of oven part 1 and the under-ceiling 11 by a screen wall 15. Space 14 is intended to be connected to a ventilation arrangement via an opening 16 situated in the rear wall 17 of the oven part.

Figure 1:
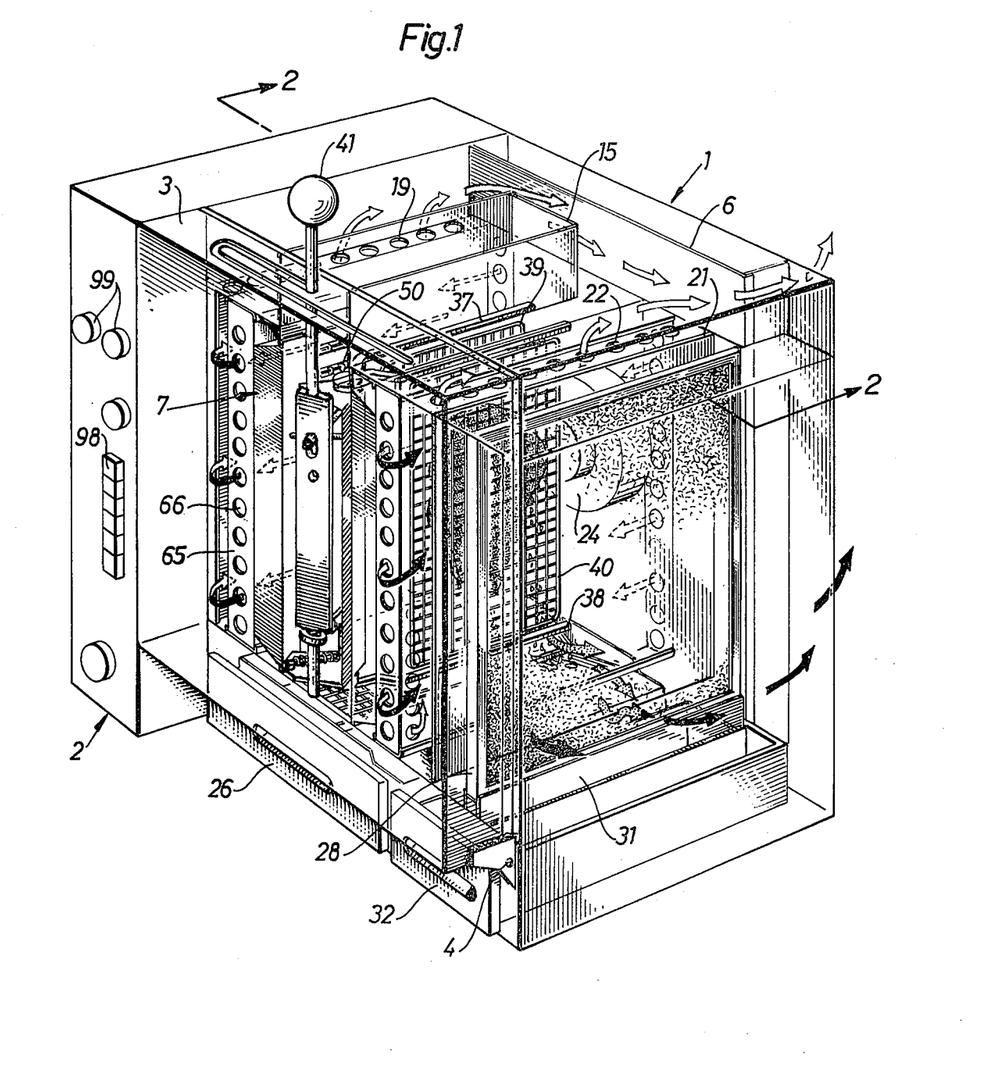
FIG. 1 is a perspective view of a first embodiment of an apparatus in accordance with the invention, the outer element of the apparatus as well as some of the inner elements being shown transparently in order to illustrate the interior construction of the oven part of the apparatus.
Figure 2:
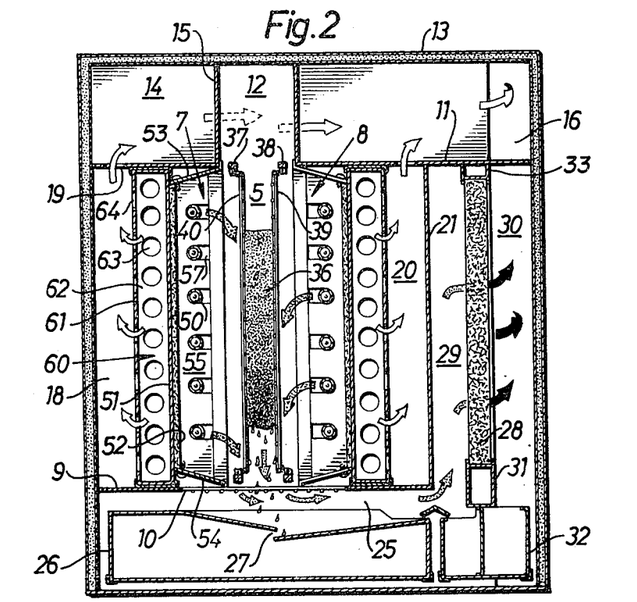
FIG. 2 shows a vertical cross section through the oven part of the apparatus according to FIG. 1 taken along lines 2—2 of FIG. 1.
Figure 3:
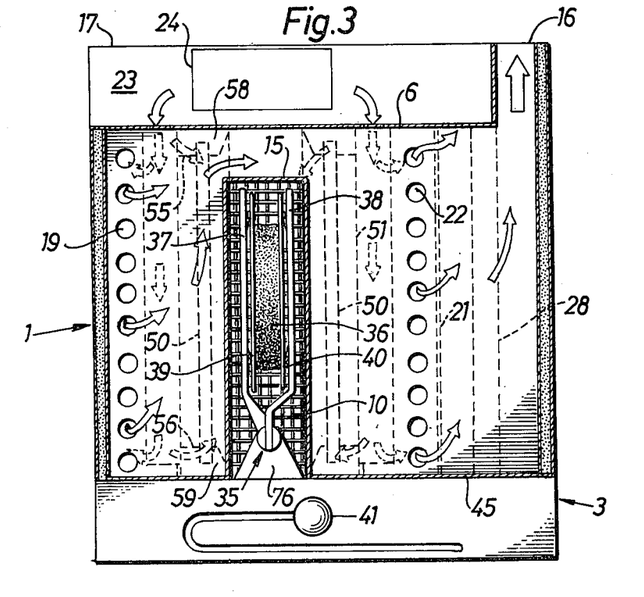
FIG. 3 is a view from above of the oven part of the apparatus according to FIG. 1 with the upper housing removed.

Between the back side of IR-radiation battery 7 turned away from oven space 5 and the side wall of oven part 1, adjacent to operating and controlling part 2, there is a space 18 which is delimited at the top by under-ceiling 11 and at the bottom by intermediate bottom wall 9, respectively. The space 18, communicating with space 14 by a number of holes 19 in under-ceiling 11, is intended to receive cooling air that has passed IR-battery 7, as will be described further in connection with the more thorough description of the IR-batteries.

Another space 20 corresponding to space 18 is arranged in connection with the other IR-battery 8. This space is delimited sideways by a side partition wall 21 which extends in parallel with the other insulated side wall of the oven part between the side edge of intermediate bottom wall 9 and the under-ceiling 11, in which holes 22 corresponding to holes 19 are arranged.

Between the rear transversal partition wall 6 and a main portion of rear wall 17 of the oven part there is a space 23, in which a fan 24 is arranged in connection with a corresponding opening in rear wall 17. Fan 24 sucks air through said opening and presses this air further on to IR-batteries 7 and 8 through holes provided for this purpose in the transversal partition wall 6, as will be described further in connection with the description of batteries 7 and 8.

In space 25 below intermediate bottom wall 9 there is a fat collecting box 26 which can be drawn out forward below oven door 3. Below oven space 5 fat collecting box 26 has an inlet opening 27 in the shape of a slot or gap formed by means of two cover sheets directed downwards and overlapping each other, whereby the fat collected in box 26 cannot be exposed to IR-radiation.

Between the side partition wall 21 and the adjacent side wall of the oven part there is a filter 28 arranged vertically, and space 29 between the filter and side partition wall 21 is in communication with space 25 below oven space 5. The space 30 between the filter and the side wall is open to the rear via an opening in rear wall 17, below opening 16, for connection to an evacuation fan, not shown, (and to which also the opening 16 can be connected). The filter 28 is displaceably arranged in a lower supporting rail 31, attached to a smaller filter fat collecting box 32, and in an upper supporting rail 33, attached to the underside of under-ceiling 11. An opening corresponding to the filter is arranged in front cover sheet 45. When oven door 3 is turned down into its open position, filter 28 can thus very easily be drawn out forward for cleaning. Fat collecting box 32 for the filter can be drawn out forward in parallel with box 26 for collecting fat from oven space 5.

On the inside of oven door 3 holding means 35 are arranged just opposite oven space 5 to hold the product 36 to be prepared vertically in the oven space. Holding means 35 include two substantially U-shaped frame elements 37 and 38, both of which resiliently support a net plate 39 and 40, respectively, between which the product 36 is gripped. The mounting of frame parts 37 and 38 in oven door 3 as well as the coupling of said elements to an operating handle 41, arranged in the oven door, will be described lateron while referring particularly to FIGS. 4 – 6.

The construction of IR-batteries 7 and 8 will now be described in more detail. As the IR-devices are identically (though reversedly) made, only IR-battery 7 will be described in detail.

IR-battery 7 consists of a radiation part and a cooling part. The radiation part includes a number of (in the shown example there are 6) tubular, electrically heated IR-radiators 50 which are arranged horizontally in a vertical plane parallel to a principal plane for the product 36 to be prepared. IR-radiators 50, placed with equal distance vertically between themselves in order to provide a "radiating plane" with a substantially uniform emitted radiation effect per surface unit, are surrounded on all sides, except on the side turned towards products 36, by a reflector consisting of a vertical and rectangular main sheet 51 parallel to the radiating plane and provided with a reflecting layer 52 of ceramic material, and of upper and lower edge sheets 53, 54 and side edge sheets 55, 56 all protruding from the edges of the head sheet.

The end parts of the IR-radiators extend out through slits 57 in side edge sheets 55, 56 to connection means (not shown) in the spaces 58 and 59 therebehind. The connection means suitably can be constructed in accordance with known principles and is connected to automatic electric contact means in the transversal partition wall 6.

The cooling part of IR-battery 7 includes a vertical, rectangular cooling box 60, one side wall of which is formed of the main sheet 51 and the other side wall 61 of which constitutes the back side of the IR-battery, delimiting space 18. The rear end wall 62 of cooling box 60 bears against rear transversal partition wall 6 and is provided with a number of holes 63 in alignment with a corresponding number of holes in transversal partition wall 6 for blowing cooling air from space 23 into the cooling box. In the side wall 61 of the cooling box there are holes 64, through which the cooling air can flow into space 18. In the front end wall 65 of the cooling box, which wall is located on some distance from front cover sheet 45, there are a number of holes 66, through which the cooling air can flow out towards the inside of cover sheet 45 for the purpose of cooling the cover sheet and thereafter sideways outwards into space 18.

Spaces 58 and 59 have a direct communication with the inside of cooling box 60, and therefore some of the cooling air flowing into the cooling box will flow past the connection means of the IR-radiators and via the slits 57 further into oven space 5.

IR-battery 7 is designed as a unit, very easily withdrawable forward (when oven door 3 is turned down into its open position and cover sheet 45 is removed), by cooling box 60 being at the top and at the bottom displaceably guided in a supporting rail attached to the underside of under-ceiling 11 and to the upper side of intermediate bottom wall 9, respectively, upper edge sheet 53 being provided with a sealing and guiding flange directed upwards and cooperating with the lower edge of screen wall 15.

In view of the design of the apparatus according to FIGS. 1 – 3, described above, it should be evident that the following principal air flow will be obtained in the apparatus:

Air sucked in and pressurized by fan 24 flows from space 23 into the cooling box 60 of each IR-battery, where it cools main sheet 51 of the reflector. A first portion of the air in each cooling box flows as pure cooling air further into spaces 18 and 20, respectively, while cooling front cover sheet 45 and then up into space 14 through holes 19 and 22, respectively, and is finally evacuated through opening 16 in rear wall 17 of the oven part. This air flow described above is illustrated by unfilled arrows in FIGS. 1 – 3.

A second portion of the air in each cooling box flows through spaces 58, 59 past the connection means of IR-radiators 50, which thereby are cooled, and via slits 57 is injected into oven space 5, where there is a reduced pressure because of the action of the exhaust fan connected to space 30. In oven space 5 the air together with vapors, fumes etc. arisen from product 36 are sucked downwards towards and through the relatively narrow gap-shaped opening formed by the outer edges of sheets 54 below product 36. The flow around the product will be directed essentially vertically downwards. After having passed the opening below the product the evacuated oven atmosphere is forced to a considerable change of direction in space 25, because the flow therein will be essentially horizontal. This fact contributes favourably to the depositing of as much as possible of the carried fat drops and the collecting of the same in fat collecting box 26. From space 25 the exhausted oven atmosphere flows upwards into space 29, then through filter 28 into space 30 and is finally evacuated through the exhaust fan (not shown) connected thereto. In FIGS. 1 - 3 the air flow from the oven space to filter 28 is illustrated by dotted arrows and from the filter by entirely filled arrows.

It is to be noted, that the exhaust fan is intended to be in continuous operation, while fan 24 advantageously is thermostat-controlled, the temperature sensing means (not shown) of the thermostat suitably being arranged in connection with space 12. In this way it will be possible to have a fast rise up to operating temperature. In this connection it should be pointed out that the vertical exhaustion of the oven atmosphere is of great importance for providing uniform temperature conditions around the product in the oven space, as convective air flows are obstructed.

Figure 4:
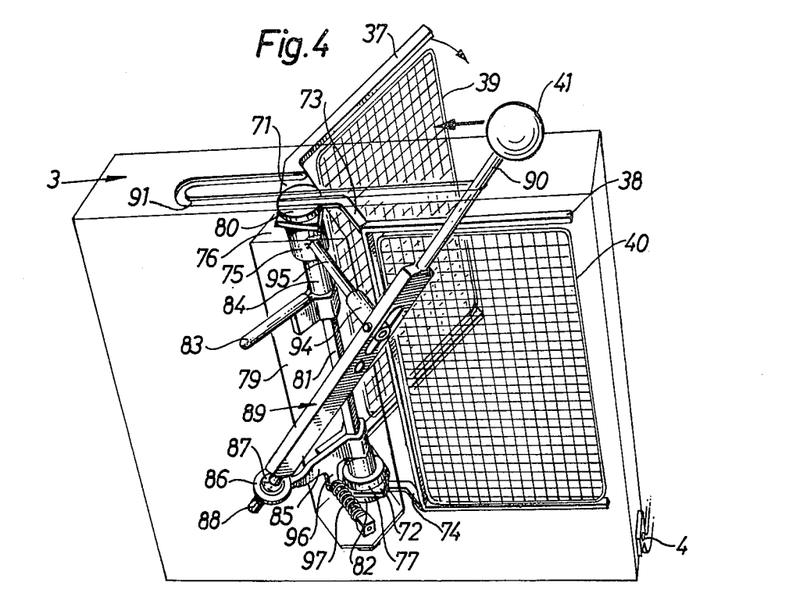
FIGS. 4 – 6 are perspective views illustrating the construction and the function of a mechanism mounted in the oven door of the apparatus according to FIG. 1, for operating, holding or supporting means of the apparatus for the product to be prepared.
Figure 5:
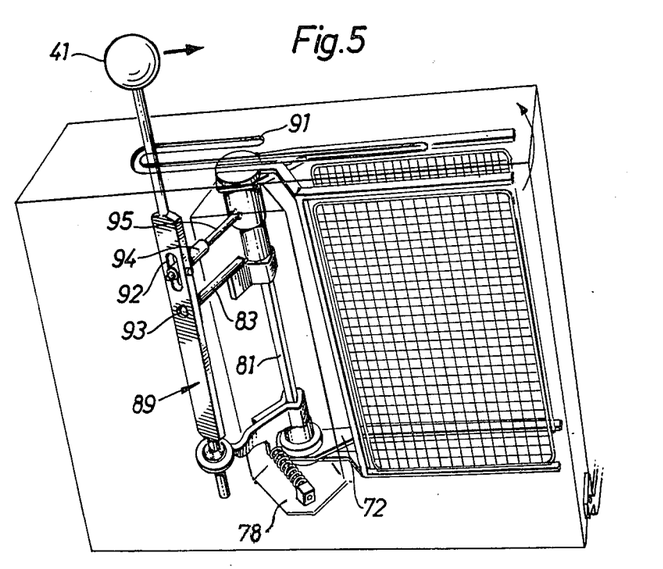
Figure 6:
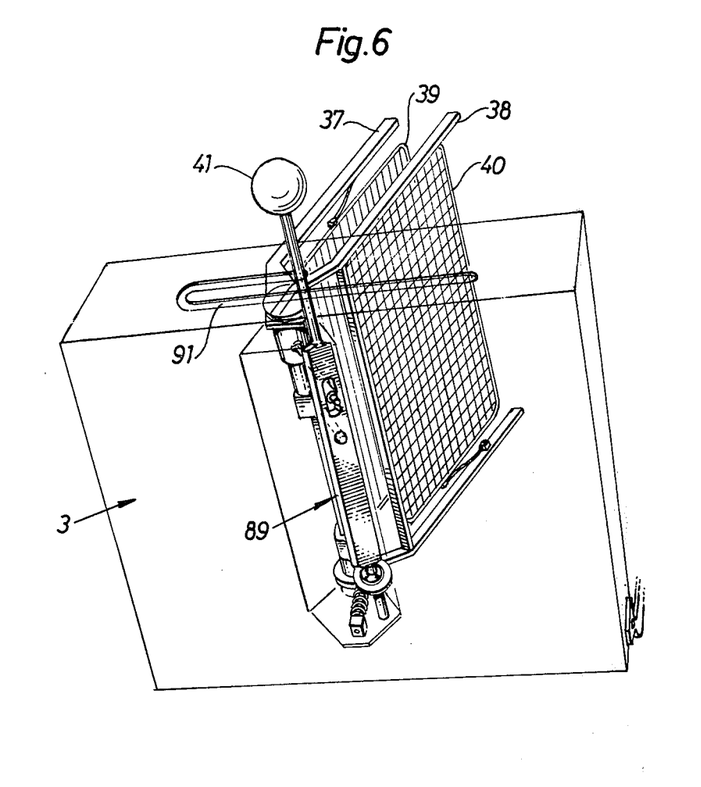

The suspension of holding means 35 in oven door 3 and the construction and function of the operating mechanism arranged in oven door 3 will now be described further in connection with FIGS. 3 - 6. It is to be noted that FIGS. 4 - 6 are views taken obliquely from underneath with oven door 3 in a open horizontal position, and that the sheet parts of the oven door are shown transparently for the purpose of elucidation.

Holding means 35, as mentioned before, include two U-shaped frame elements 37, 38 with net plates 39 and 40, respectively, resiliently attached thereto. The parallel branches of frame elements 37, 38 are provided with angle extensions 71, 72 and 73, 74, respectively, the ends of which are arranged to be rotatable around a common rotation axis, extending in parallel with the main plane of the oven door and which is vertical when the oven door is in its shut position. The end of angle extension 71 is thus attached to one end of a hollow cylinder 75 which extends through and is freely pivoted in a first generally triangular supporting sheet 76, projecting from the inside of oven door 3. The end of the corresponding angle extension 72 is attached to the outer end of a hollow cylinder 77 which extends through and is freely pivoted in a second generally triangular supporting sheet 78 which as well projects from the inside of oven door 3 in parallel with the first supporting sheet 76. Between the two supporting sheets 76 and 78 an angular cover sheet 79 is arranged to enclose the mechanism elements located between the supporting sheets.

The end of angle extension 73 is attached to a circular cylindrical end plate 80 in its turn attached to the outer end of one rounded end part of a square shaft 81, which extends through and is freely rotatable in cylinder 75 and the end of angle extension 71. The end of angle extension 74 is in a corresponding way attached to an end plate 82 in its turn attached to the outer end of the other rounded end part of square shaft 81, which end part extends through and is freely rotatable in cylinder 77 and the end of angle extension 72. At said first mentioned end part, shaft 81 is provided with a first fixed, perpendicularly projecting protrusion in the shape of a pin 83 with a rounded outer end. Between the attachment of pin 83 to shaft 81 and the cylinder 75 a distance sleeve 84 is arranged. At said other end part shaft 81 is provided with a second fixed perpendicularly projecting protrusion 85, having substantially the same length as and extending in parallel with pin 83 and provided with a projection 96 for cooperation with a spring-loaded rocker 97 as well as with a bearing ring 86 located at the free end thereof and intended for a ball 87, so that ring 86 and ball 87 form a ball joint. Ball 87 has an axial bore, in which the lower rounded end part 88 of an operating rod 89 is arranged to be rotatable and displaceable. The upper rounded end part 90 of rod 89 extends through and is displaceable along slit 91 provided in the upper outer sheet of oven door 3 and is provided at its end with a handle 41. The intermediate section of rod 89 has a longitudinal slit 92 and an oval hole 93 located therebelow and extending in the longitudinal direction of the rod. In the slit one end of a sleeve 94 is pivoted around a pin extending perpendicularly to the longitudinal direction of slit 92. Sleeve 94 has a through-hole for continuous reception of a pin 95, extending from cylinder 75 and having substantially the same length as pin 83 which is intended to cooperate with said oval hole 93 located below.

Slit 91 includes a longer slit part and a shorter one. Displacement of rod 89 so that its end part 90 is at the end of the longer slit part means that the holding means are in a first position for receiving a product (FIG. 4) and displacement of rod 89 so that its end part 90 is at the end of the shorter slit part means that the holding means are in a second position for insertion into the oven space (FIGS. 3 and 6).

In the position shown in FIG. 4 (oven door turned down) frame element 38 with net plate 40, hereafter referred to as the lower holding element, is kept in a lowered horizontal position, because the springloaded rocker 97 is pressing protrusion 85 to a first end position corresponding to maximum clockwise turning of shaft 81. Frame element 37 with net plate 39, hereafter referred to as the upper holding element, is kept in an upturned vertical position by pin 95 being brought to a first end position by sleeve 94 and rod 89, corresponding to maximum counter-clockwise turning of cylinder 75 (and, via frame element 37, of cylinder 77). Now, if by means of handle 41 rod 89 is moved along the longer slit part in the direction towards the bent part of slit 91, protrusion 85 is kept in the shown position by springloaded rocker 97, for that reason the operating rod moves in an essentially horizontal plane while bringing along pin 95, whereby cylinder 75 is rotated clockwise and the upper holding element is turned down towards the lower holding element. During this movement pin 95 will at first be pushed further into sleeve 94 and will then begin to be pulled out of the sleeve again. Furthermore during said movement the operating rod will be turned clockwise around its own axis, in addition to which the end part 88 of the rod (while being turned) is displaced in ball 87.

When rod 89 has been brought to the bent part of slit 91, the rod is substantially parallel with shaft 81 and hole 93 is just in front of the rounded end of pin 83. Furthermore, pin 95 has been brought to its second end position corresponding to maximum clockwise turning of cylinder 75, which means that the upper holding element has been turned down against the lower, still horizontal holding element. Pin 95 is now essentially parallel with pin 83 and protrusion 85.

When rod 89 has been brought through the bent part of slit 91, the end part of pin 83 has been brought into engagement with hole 93, whereby shaft 81 and cylinders 75, 77 are locked to each other so as to rotate together. That position is shown in FIG. 5.

By continued displacement of rod 89 along the shorter slit part in the direction towards the end thereof, shaft 81 and cylinders 75, 77, and consequently both the upper and the lower holding elements, are thus caused to rotate counterclockwise against the action of the spring-loaded rocker 97. The holding elements will consequently be turned up together towards the intended vertical position for insertion into the oven space, which position is reached when rod 89 has been moved to the end of the shorter slit part. The holding elements are now kept in that position due to the fact that spring-loaded rocker 97 after reversal presses protrusion 85 to a second end position corresponding to maximum counter-clockwise turning shaft 81. That position is shown in FIG. 6.

During the displacement along the shorter slit part the angle between rod 89 and pin 83 will vary, for that reason it is essential that pin 83 has necessary clearance in oval hole 93.

It is obvious that analogous but reversed conditions exist when the operating rod is displaced from the position shown in FIG. 6 to the position shown in FIG. 4.

When using the apparatus according to FIGS. 1 – 6, which apparatus is particularly suitable for mobile use because it is air cooled, oven door 3 is turned down into the horizontal open position. Thereafter operating handle 41 is displaced from the position shown in FIG. 6 to the position shown in FIG. 4, whereby the holding elements will be opened. The product to be prepared is now placed on the lower holding element 38, 40, after which handle 41 is brought back to the position shown in FIG. 6. When oven door 3 now is brought back to its vertical shut position, holding means 35 with product 36 held therein will be turned into oven space 5, space 12 enabling the upper rear parts of holding means 35 to be turned into oven space 5. It is to be noted, that handle 41 can be used for turning oven door 3 down and up, as well as for operating holding means 35, and that these operations can be done with one hand only. One hand is thus free for handling the product in question.

After product 36 thus has been positioned in oven space 5, suitable preparing or cooking conditions are chosen at the front of operating and controlling part 2, namely desired intensity of and time for the radiation, by pushing a suitable push button in the row of push buttons 98 controlling conventional time and power controlling circuits. The preparing procedure is thereafter started by means of the start/stop controls 99, product 36 almost immediately being exposed to maximum constant radiation, which has shown to be of great importance for obtaining the best possible surface of the product prepared. After the predetermined radiation time the IR-radiation is automatically disconnected, the oven temperature thanks to the controlled air flow through the oven space then falling very quickly down to a suitable temperature for warm-keeping. The fact that the preparing procedure is finished is indicated by a signal means located on the lower part of operating and controlling part 2. The operating and controlling part is furthermore provided with a means for fault indicating if the current supply to any of the IR-radiators should cease and give changed radiation intensity.

In the table below typical preparing data for the apparatus according to FIGS. 1 – 6 are given, the distance between the planes of the IR-radiators being approximately 10 cm.

| Product | Thickness | Intensity in radiation plane | Radiation exposure time |
|---|---|---|---|
| Beef steak | 10–12 mm | ~ 8 W/cm$^2$ | 1 min. |
| Entrecote | 13–14 mm | ~ 8 W/cm$^2$ | 2 min. 15 sec. |
| Tournedos | 30–40 mm | ~ 5 W/cm$^2$ | 3 min. 30 sec. |
| Pork chop | 15 mm | ~ 6,5 W/cm$^2$ | 2 min. 15 sec. |
| Hamburgers (deep frozen) | 10 mm | ~ 8 W/cm$^2$ | 2 min. |

Although the table does not examplify preparation of a fish product, it should be pointed out that the apparatus is extremely well suitable also for that purpose. However, the radiation intensity, particularly when boiling, ought to be reduced a little.

Figure 7:
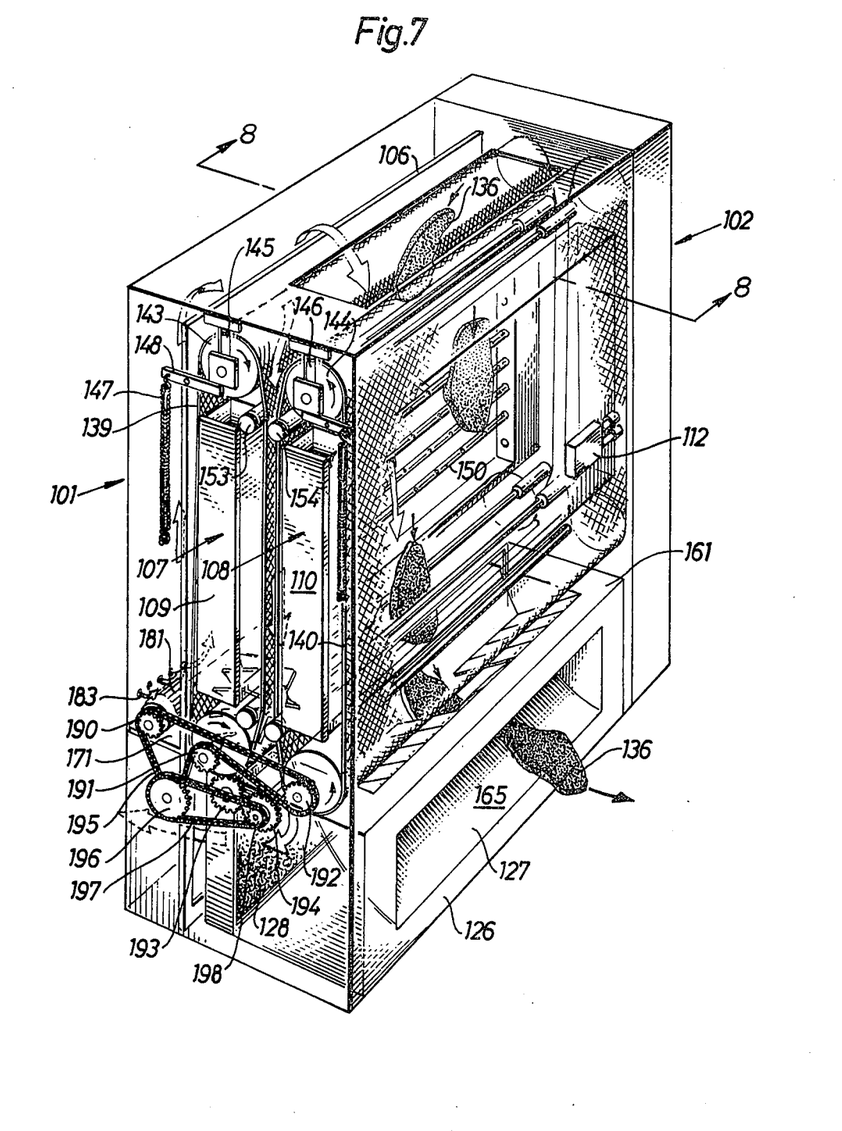
FIG. 7 is a perspective view of the same kind as FIG. 1 of a second embodiment of an apparatus in accordance with the invention.
Figure 8:
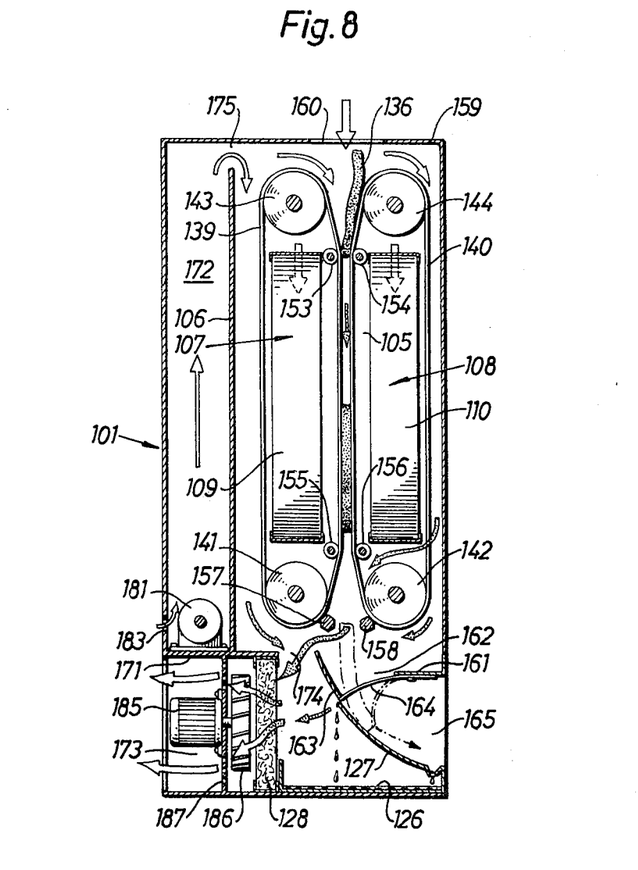
FIG. 8 shows a vertical section through the oven part of the apparatus in FIG. 7, taken along line 8—8 of FIG. 7.

The apparatus according to FIGS. 7 and 8, like the apparatus according to FIGS. 1 – 6, consists of an oven part 101 and an operating and controlling part 102 arranged at one side wall of the oven part. At its front the operating and controlling part is provided with controls and indicating means (not shown) corresponding to those of the apparatus according to FIGS. 1 – 6. The apparatus has a vertical slot-shaped oven space 105, having an extension in the lateral direction of the apparatus and defined by two parallel vertically arranged IR-radiation batteries 107, 108 extending between the two side walls of oven part 101 and arranged in such a way that they can be pulled out horizontally at the side turned away from operating and controlling part 102, when the side wall is removed. Principally, IR-batteries 107, 108 are constructed like batteries 7, 8 of the apparatus according to FIGS. 1 – 6, i.e. with a number of horizontal IR-radiators 150, arranged in a reflector. However, batteries 107, 108 differ from IR-batteries 7, 8 on one hand in that they have cooling boxes intended for water cooling (i.e. closed) (suitably thermostatically controlled) and on the other hand in that the end parts of the IR-radiators 150 and connection means are arranged in special vertical box girders 109, 110 open at the top and the bottom. The end walls of the IR-batteries facing operating- and controlling part 102 are provided with automatic connector means for electric power and cooling water intended for cooperation with the corresponding connector means in the wall of operating and controlling part 102, as indicated at 112.

The holding means of the apparatus for holding the product 136 to be prepared include two endless driven net bands 139, 140. Each net band has a vertical part running downwards through the oven space in parallel with the radiation planes of IR-batteries 107, 108 and a vertical part running upwards at the back side of the associated IR-battery, each net band being guided around a lower horizontal drive roller 141 and 142, respectively, and around an upper horizontal guide or idle roller 143 and 144, respectively. The lower drive rollers 141, 142 are rotatable although stationary mounts, while the upper guide rollers 143, 144 are vertically resiliently suspended to obtain proper band tension. Thus, shafts of the guide rollers are guided in vertical slits 145, 146 and are pressed upwards by a lever arm 148 loaded by a tension spring 147. In order to keep the parts of the net bands 139, 140 which are in the oven space on a suitable distance from each other to provide a gripping effect non-driven horizontal guide rollers 153, 154 and 155, 156 are arranged at the slot-shaped inlet opening of oven space 105, located at the top, at the upper edges of IR-batteries 107, 108 facing each other and at the correspondingly defined slotshaped outlet opening of the oven space located at the bottom, respectively. In order to clean net bands 139, 140 a horizontal hexagonal roller 157 and 158, respectively, is arranged in engagement with the net band 139 and 140, respectively, in connection with each drive roller 141, 142. The hexagonal rollers 157, 158 are driven with such a rotational speed that they are scraping off any product rests from the net bands.

For the insertion of a product 136 to be prepared, there is a rectangular opening 160 in the roof sheet 159 of the oven part, through which the product can be dropped down between the uppermost portions of the descending parts of net bands 139, 140 said uppermost portions converging downwards to guide rollers 153, 154. To enable reception and holding of products 136 of different thickness between the net bands, guide rollers 153 - 156 inside their end parts have their diameters reduced i.e. they allow the net transport band 139, 140 to yield in a direction away from the centre plane of oven space 105.

For the reception and discharge of a product 136, having passed vertically downwards through oven space 105 a front intermediate bottom wall 161 extends from the front side of the oven part and essentially horizontally inwards to a position below the lowest portions of the descending parts of net bands 139, 140, said lowest portions diverging downwards to drive rollers 141, 142 and the hexagonal or cleaning rollers 157, 158 cooperating therewith. Front intermediate bottom wall 161 is provided with a product receiving pocket 162 consisting of a rear fixed sheet 163 inclined forward and downwards and a front sheet 164 inclined backwards and downwards and formed by a number of flexible sheet strips, each of which can be bent separately downwards, the lower edges of said sheet strips normally bearing against the lower edge of rear sheet 163. Below front intermediate bottom wall 161 there is a fat collecting box 126 withdrawable forward and having a discharge opening 165. The box has a front cover sheet 127 which is bent backwards and upwards from the lower edge of opening 165 and extends into juxtaposition with the downwards inclined sheet 163 and consequently forms a reception sheet for prepared products 136, after these, due to their own weight, have passed pocket 162 while bending down a number of the flexible strips of sheet 162. At its front cover sheet 127 has a fat collecting groove with holes so that collected fat can flow down into box 126. The front intermediate bottom wall is fastened to box 126 and is withdrawable therewith, whereby drive and cleaning rollers 141, 142, 157, 158 are easily accessible.

The oven part 101 is provided with a rear transversal partition wall 106 which extends from the bottom of the oven part almost up to its ceiling 159 in parallel with IR-batteries 107, 108. A rear horizontal intermediate bottom wall 171 delimits together with rear transversal partition wall 106 an upper rear space 172 and a lower rear space 173. Rear intermediate bottom wall 171 also extends forward from transversal partition wall 106 towards front intermediate bottom wall 161 to a position below drive roller 141, so that a transversal slit-shaped opening 174 is formed relative to the front intermediate bottom wall.

In upper rear space 172 an electric drive motor 181 for the various driven rollers is mounted on intermediate bottom wall 171. In the rear wall of oven part 101 there are a number of air inlet holes 183 in connection with motor 181. In lower rear space 173 which is open backwards to be connected to an air evacuating device, a motor 185 for a suction or exhaust fan 186 is arranged, the suction fan being located on the other side of transversal partition wall 106 which here is provided with several air flow holes 187. Suction fan 186 is arranged to suck air through a filter 128, arranged vertically between the bottom of oven part 101 in conncection to the rear edge of box 126 and the inner edge part of rear intermediate bottom wall 171 and extending across the entire width of the oven part in parallel with transversal partition wall 106 and IR-batteries 107, 108. Filter 128 as well as the IR-batteries are arranged so as to be easily withdrawable sideways, when the side wall of oven part 101 turned away from operating and controlling part 102 is removed.

Said side wall is designed as a double-wall, in which a number of gear wheels and chains for driving the rollers are arranged (FIG. 7). The shafts of motor 181 and rollers 141, 142, 157, 158 thus passes through the inner sheet of the double-wall. Gears 190, 191, 192, 193 and 194, respectively, are attached to said shafts. A first chain 195 runs around gears 190, 192, 191 (to rotate the identical gears 191, 192 in opposite directions) and around a smaller gear (not shown) which is attached to the same shaft as a bigger gear 196. A second chain 197 runs around bigger gear 196 and a smaller gear 198 which is attached to the same shaft as gear 194. Gear 194 is in direct gear engagement with gear 193.

It is thus understood that motor 181 drives drive rollers 141, 142 with the same speed in opposite directions and cleaning rollers 157, 158 likewise with equal, although suitably stepped-up speeds in opposite directions.

The air flow through the apparatus according to FIGS. 7 and 8 is provided by means of fan 186 which sucks air into the apparatus through inlet opening 160 in roof sheet 159 and through air inlet holes 183 in the rear wall and to a less extent through discharge opening 165 for flowing air through oven space 105 and through box girders 109, 110 and for flowing air around the parts of net bands 139, 140 passing outside of the oven space. The air is then sucked through opening 174 and through filter 128, before it is blown out through space 173.

A major part of the air flowing through the apparatus is sucked in through opening 160 and passes through oven space 105 while providing a controlled vertical air flow around the products 136 to be prepared. The air flowing in through holes 183 flows around and cools motor 181 and, after passing opening 175 between the upper edge of transversal partition wall 106 and roof sheet 159, is essentially sucked down behind IR-battery 107. The air flowing in through discharge opening 165 is essentially sucked towards filter 128 through openings located at the connection between the lower edge of sheet 163 and the upper edge of cover sheet 127, while taking with it a great deal of the fat deposited on sheet 163 and stripped sheet 164, whereby said fat can be collected into fat collecting box 126. It is to be noted that the displaced or offset position of opening 174 relatively to the outlet opening from the oven space means that the air flowing out from the oven space is given a change of direction which is favourable with respect to the separation of the fat.

It is further to be noted that the air flows shown by arrows in FIGS. 7 and 8 merely are schematic and that the air flows outside oven space 105 can be given desired proportions by dimensioning the spaces, slots, openings etc., through which these flows are passing, in a suitable way.

The preparing procedure in the apparatus according to FIGS. 7 and 8 differs from that of the apparatus according to FIGS. 1 - 6, particularly in that the use of circulating net bands enables a continuous operation. Products of the same kind can thus be fed into the apparatus through opening 160 as required, the radiation time being the same for each product and equal to the time it will take for the product, with a pre-set speed of net bands 139, 140, to pass through oven space 105. After the product has passed through the oven space and the net bands have released the ready prepared product, it falls down through pocket 162 and slips, after having bent away a required number of strips of sheet 164, easily accessible down along sheet 127.

The apparatus according to FIGS. 7 and 8 permits different kinds of intensity adjustments, thanks to the net band transportation of the products to be prepared. Thus, the intensity of the radiation from each IR-battery can be differentiated vertically, for instance so that the intensity is lower at the top of the oven space, which is advantageous if the products to be prepared are deep-frozen. The intensity can be controlled for instance by means of a tyristor system for supplying different powers to the IR-radiators 150 and/or by placing the IR-radiators with different distances from each other and/or from the centre plane of the oven space. Such an intensity control can also be combined with control of the speed of the net bands, for instance so that a non-deep-frozen product will pass quicker through initial radiation having lower intensity.

What is claimed is:

1. An apparatus for cooking a food product of meat, fish or the like comprising an oven defining an oven space and including holding means for holding the product to be cooked in the oven space, and IR-radiating means for IR-radiation of the product in this oven space, said holding means including means for holding the product vertically in the oven space, said IR-radiating means being arranged at two opposite sides of the oven space on opposite sides of the holding means for simultaneous two-sided irradiation of the product, said IR-radiating means including a plurality of generally horizontally extending vertically spaced separate tubular electric IR-elements arranged on said opposite sides of the oven space for emitting IR-radiation with wavelengths within the range of 0.7 to 5 μm, and fan means for providing a controlled air flow directed downwards around the product during its radiation in the oven space.

2. An apparatus according to claim 1, wherein the oven space defines a generally vertically extending slot and said IR-radiating means is positioned with said tubular elements adjacent to each of the sides of the slot.

3. An apparatus according to claim 1, characterized in that said holding means include two endless net or grill bands (139, 140) passing vertically through the oven space (105) and arranged to transport the food product (136) between each other vertically downwards through the oven space.

4. An apparatus as defined in claim 1 wherein said IR-radiating means emits IR-radiation having a wavelength of about 1.2 μm.

5. An apparatus according to claim 1, characterized in that the connection means at both ends of the IR-elements (50) are arranged outside the oven space (5), said fan means being arranged to suck air into the oven space through slots (57) around the IR-elements, where said elements pass through the wall of the oven space.

6. An apparatus according to claim 3, characterized in that said fan means are arranged to evacuate air from the oven space through a bottom opening and after a change of direction through a filter (28; 128), a collecting container (26; 126) for collecting fat dripping from the product being arranged below said bottom opening, said container being arranged that collected fat cannot be exposed to radiation from the oven space through said bottom opening.

7. An apparatus according to claim 1, characterized in that said IR-radiating means are arranged to provide an IR-radiation with an intensity of between approximately 5 W/cm² and 8 W/cm² at a distance of approximately 5 cm from the center of the product.

8. Apparatus according to claim 7, wherein said oven includes a door pivotally mounted thereon for pivotal movement with respect to said slot between open and closed positions, said door lying in a plane perpendicular to said slot in said closed position, and said holding means being mounted on the inside of said door to close the oven space so that said holding means are in position in said slot when the door is closed.

9. An apparatus according to claim 7, characterized in that the door (3) is pivotable around a horizontal shaft (4) the holding means (35) being arranged to be turned into the oven space essentially in a vertical plane substantially in parallel with said two opposite sides of the oven space (5).

10. An apparatus according to claim 9, characterized in that the door (3) is provided with means for bringing the holding means (35), when the door is open, into a condition for receiving the food product (36) to be prepared substantially horizontally.

11. An apparatus according to claim 10, characterized in that said holding means (35) include two net or grill elements (39, 40) each arranged to engage a respective one of the sides of the food product to be prepared, said elements being pivotable in relation to each other at the inside of the door (3), and that the door is provided with a displaceable handle (41, 89) guided in a slit and coupled to said net elements in such a way that when the handle is in a first end position in the slit the net elements are in a vertical position to be turned into the oven space (5) and when the handle is in an intermediate position in the slit the net elements are in an essentially horizontal position with gripping action and when the handle is in a second end position one net element is turned up in relation to the other net element which is substantially horizontal for receiving a food product.

12. An apparatus according to claim 1 characterized in that said IR-radiating means are arranged in two substantially parallel vertical planes with a distance of the order of 10 cm from each other.

* * * * *